US009751623B2

(12) United States Patent
Pfaller (10) Patent No.: US 9,751,623 B2
(45) Date of Patent: Sep. 5, 2017

(54) FLEXBEAM UNIT FOR A HINGELESS OR A HINGE AND BEARINGLESS MULTI-BLADE ROTOR OF A ROTARY WING AIRCRAFT

(71) Applicant: AIRBUS HELICOPTERS DEUTSCHLAND GMBH, Donauworth (DE)

(72) Inventor: Rupert Pfaller, Riemerling (DE)

(73) Assignee: AIRBUS HELICOPTERS DEUTSCHLAND GMBH, Donauworth (DE)

( * ) Notice: Subject to any disclaimer, the term of this patent is extended or adjusted under 35 U.S.C. 154(b) by 352 days.

(21) Appl. No.: 14/594,601

(22) Filed: Jan. 12, 2015

(65) Prior Publication Data

US 2015/0197333 A1    Jul. 16, 2015

(30) Foreign Application Priority Data

Jan. 14, 2014    (EP) .................................... 14400001

(51) Int. Cl.
    *B64C 27/33*    (2006.01)
(52) U.S. Cl.
    CPC .................................... *B64C 27/33* (2013.01)
(58) Field of Classification Search
    CPC ......... B64C 27/32; B64C 27/33; B64C 27/37; B64C 27/39; B64C 27/41; B64C 11/02; B64C 11/04
    USPC .............................. 416/134 A, 138, 140, 141
    See application file for complete search history.

(56) References Cited

U.S. PATENT DOCUMENTS

| 4,344,739 | A | 8/1982 | Derschmidt et al. |
| 5,284,420 | A | 2/1994 | Guimbal |
| 5,820,344 | A | 10/1998 | Hamilton et al. |
| 7,275,913 | B2 * | 10/2007 | Becker .................... B64C 27/33 416/134 A |

(Continued)

FOREIGN PATENT DOCUMENTS

| EP | 0019047 | 11/1980 |
| EP | 0538088 | 4/1993 |

(Continued)

OTHER PUBLICATIONS

Extended European Search Report for European Application No. 14400001.5, Completed by the European Patent Office, dated Jun. 12, 2014, 6 Pages.

*Primary Examiner* — Dwayne J White
*Assistant Examiner* — Peter T Hrubiec
(74) *Attorney, Agent, or Firm* — Brooks Kushman P.C.

(57) ABSTRACT

A flexbeam unit for a multi-blade rotor of a rotary wing aircraft, the flexbeam unit comprising a plurality of flexbeam elements that define a predetermined number of torsion elements and a ring-shaped connection zone for attachment to a rotor hub associated with a rotor shaft of the multi-blade rotor, each flexbeam element passing the ring-shaped connection zone in a tangential manner and uninterruptedly connecting a first torsion element to a second torsion element of the predetermined number of torsion elements, wherein each flexbeam element overlaps at least one in the circumferential direction of the ring-shaped connection zone immediately following flexbeam element and is overlapped by at least one in the circumferential direction of the ring-shaped connection zone immediately preceding flexbeam element.

18 Claims, 7 Drawing Sheets

(56) References Cited

U.S. PATENT DOCUMENTS 7,384,238 B2    6/2008   Becker et al.

FOREIGN PATENT DOCUMENTS

| EP | 1613534 | 8/2006 |
|---|---|---|
| WO | 2004089747 | 10/2004 |

* cited by examiner

FLEXBEAM UNIT FOR A HINGELESS OR A HINGE AND BEARINGLESS MULTI-BLADE ROTOR OF A ROTARY WING AIRCRAFT

CROSS REFERENCE TO RELATED APPLICATION

This application claims priority to European patent application No. EP 14 400001.5 filed on Jan. 14, 2014, the disclosure of which is incorporated in its entirety by reference herein.

BACKGROUND OF THE INVENTION (1) Field of the Invention

The invention is related to a flexbeam unit for a multi-blade rotor of a rotary wing aircraft, said flexbeam unit comprising a plurality of flexbeam elements with the features of claim 1.

(2) Description of Related Art

A flexbeam unit is used in a so-called hingeless or a so-called hinge- and bearingless rotor system to connect rotor blades of a multi-blade rotor of a rotary wing aircraft to an associated rotor shaft of the aircraft. During operation, i.e. rotation of the multi-blade rotor, the flexbeam unit must withstand tremendous centrifugal forces that the rotor blades apply thereto, while permitting their flapping, pitch and lead/lag motions. Therefore, the flexbeam unit comprises special, in particular fiber reinforced composite material flexbeam elements that are flexible enough in torsion to allow twisting for blade movement without bearings, in the case of a bearingless rotor system, or without discrete hinges, in the case of a hingeless rotor system.

These flexbeam elements usually possess lead-lag-soft regions that permit motions of associated rotor blades in a hingeless or a hinge- and bearingless rotor system in the lead-lag direction. The lead-lag-soft regions thus constitute fictitious vertically oriented axes, so-called virtual lead-lag hinges, about which the rotor blades execute forward and backward lead-lag motions. Furthermore, these flexbeam elements realize flapwise-soft regions that enable flapping of the associated rotor blades in the vertical direction and, thus, constitute fictitious horizontally oriented axes, so-called virtual flapping hinges, about which the associated rotor blades execute upward and downward flapwise motions in a hingeless or a hinge- and bearingless rotor system. The distance between these virtual flapping hinges and the axis of the rotor shaft is referred to as the flapping hinge distance. Moreover, only in a bearingless rotor system, these flexbeam elements usually comprise torsion weak regions.

In a hingeless or a hinge- and bearingless rotor system, the flapping hinge distance is relatively large. The flapping hinge distance is usually approximately 7 to 12% of a given rotor-disc radius, measured from the axis of the rotor shaft radially outward to a tip of a selected rotor blade. A large flapping hinge distance in a hingeless or a hinge- and bearingless rotor system allows, during operation, for a good control response and maneuverability of the rotary wing aircraft, but unfortunately also leads to a high natural flapping frequency. This relatively high natural flapping frequency and the vibrations that result therefrom in the hingeless or the hinge- and bearingless rotor system are disadvantageous in terms of flying characteristics of the rotary wing aircraft and lead to large stresses on blade connectors provided at the flexbeam elements for connection of the associated rotor blades. Because of these large stresses and the strength that is therefore required for the flexbeam elements, it is extremely difficult to reduce the virtual flapping hinge distance or decrease it below the specific value of about 7%.

The document EP 1 613 534 B1 describes a multi-blade rotor having four rotor blades, wherein each two rotor blades are located exactly opposite to one another with a 180° offset and wherein very flatly designed flexbeam elements associated with these rotor blades are embodied continuously, i.e. with no interruption, and attached to an associated rotor star. The flexbeam elements are realized as connector arms, each connecting a pair of rotor blades, i.e. two diametrically opposed rotor blades. More specifically, each pair of rotor blades is connected via two parallel connector arms that pass an associated rotor shaft on diametrically opposed passing points in a tangential manner, such that the pair of rotor blades and the two connector arms form an oval-shaped opening. As a result, centrifugal-force segments formed by these connector arms are likewise continuous so that the considerable centrifugal forces applied by one of the rotor blades of a given pair of rotor blades can directly be transferred to the diametrically opposed rotor blade. Furthermore, each pair of rotor blades possesses two common auxiliary flapping hinges and a common or different virtual lead-lag-hinge. Accordingly, a flapwise-soft connection of the rotor blades is produced by the fact that the connector arms can deflect between auxiliary flapping hinges, thus, leading to a greater softness in the connection region.

While the realization of flexbeam elements in the form of such connector arms allows to reduce the virtual flapping hinge distance to values of less than 7%, these connector arms are complicated in manufacturing because of their reduced cross section and their very flat design, which however need to allow for a predetermined weakness in torsion, so that they only have a comparatively reduced fatigue lifetime. The reduced cross section and very flat design also complicate the attachment of the connector arms to the associated rotor star which should not weaken the overall strength of the connector arms, i.e. the attachment, but still allow for the predetermined weakness in torsion. Therefore, multi-blade rotors having flexbeam units comprising such connector arms are not suitable for comparatively big rotary wing aircrafts where the loads that need to be lifted by the multi-blade rotors trespass a given threshold.

The document EP 0 538 088 A1 describes a multi-blade rotor, especially for a helicopter rear anti-couple propeller, which includes a hub body to which are connected twistable straps. Each such twistable strap is formed by two bundles of fibers with a flattened cross section that are arranged radially around the hub. Each one of the bundles forms at least two halves of different blades and is twisted and curved in the region of its passage near the center of the hub body in such a way that it forms a tangent to the circumference of the center of the hub body along the greater dimension of its cross section. Furthermore, each one of the bundles overlaps a first other one in the circumferential direction of the multi-blade rotor immediately following bundle and is overlapped by a second other one in the circumferential direction of the multi-blade rotor immediately preceding bundle. However, each such bundle is twisted in the region of its passage near the center of the hub body, thereby decreasing its stiffness such that this multi-blade rotor as such is not suitable for use with comparatively big rotary wing aircrafts.

BRIEF SUMMARY OF THE INVENTION

It is, therefore, an object of the present invention to provide a flexbeam unit for a multi-blade rotor of a rotary wing aircraft, said flexbeam unit comprising a plurality of flexbeam elements that are comparatively easy to manufacture, provide for an increased fatigue lifetime of the flexbeam unit and are suitable for use with comparatively big rotary wing aircrafts.

This object is solved by a flexbeam unit for a multi-blade rotor of a rotary wing aircraft, said flexbeam unit comprising a plurality of flexbeam elements with the features of claim 1.

More specifically, according to the invention a flexbeam unit for a multi-blade rotor of a rotary wing aircraft comprises a plurality of flexbeam elements that define a predetermined number of torsion elements and a ring-shaped connection zone for attachment to a rotor hub associated with a rotor shaft of the multi-blade rotor. Each flexbeam element passes the ring-shaped connection zone in a tangential manner and uninterruptedly connects a first torsion element to a second torsion element of the predetermined number of torsion elements. Furthermore, each flexbeam element overlaps at least one in the circumferential direction of the ring-shaped connection zone immediately following flexbeam element and is overlapped by at least one in the circumferential direction of the ring-shaped connection zone immediately preceding flexbeam element. Moreover, each flexbeam element comprises at least one lath-shaped beam member.

It should be noted that in the context of the present invention the term "torsion element" refers to an element which is torsion elastic and flexible in order to allow for backward and forward lead-lag motions, flapping movements and pitch angle control movements of an associated rotor blade of the multi-blade rotor.

The inventive flexbeam unit is particularly suitable for use with comparatively big rotary wing aircrafts and allows realization of a comparatively low virtual flapping hinge distance of less than 5%. Furthermore, the flexbeam unit has a comparatively small weight and allows for application of an easy and light main rotor shaft design. In this flexbeam unit, the flexbeam elements are realized as exchangeable components arranged in a star-shaped configuration that defines an interlaced structure in web-like form and preferably defining a ring-shaped connection zone with increased connection zone strength providing for an increased fatigue lifetime and allowing for connection in close proximity to the circumference of, and preferably immediately to the rotor shaft. Thereby, each flexbeam element uninterruptedly bypasses the rotor shaft of the multi-blade rotor, so that centrifugal and collective bending loads are not transferred from the rotor blades to the rotor shaft, but via the flexbeam element to diametrically opposed rotor blades.

Preferably, the flexbeam elements of the flexbeam unit have a comparatively easy design so that they are easy to manufacture. More specifically, they can preferably be embodied by simple components without complex cross sections and without having transition areas to their cross sections, e.g. with strip-, bar- and/or lath-like beam members with simple rectangular cross sections that allow for connection to associated rotor blades with no need for a cross section change. Such strip-, bar- and/or lath-like beam members may have a comparatively short length as the afore-mentioned transition areas can be avoided, especially with respect to a flapping weak section constituted thereby. Substantially immediately following such a flapping weak section, flapping stiffness of these strip-, bar- and/or lath-like beam members can be increased rapidly so that no flap stop is required. Preferably, the strip-, bar- and/or lath-like beam members are manufactured using fiber composite materials.

This can be done in a resin transfer molding (RTM) process, as they are merely two-dimensional with a single small bended area having a thickness where the exothermic reaction is reduced.

Providing each a flexbeam element with at least one lath-shaped beam member allows for an easy two-dimensional design of the flexbeam elements. Therein, each lath-shaped beam member can be divided in two or more preferably lath-shaped sub-members, each one on top of a next one. Such lath-shaped sub-members can be connected, unconnected or alternatively partially connected with each other.

According to a preferred embodiment, the first torsion element, which is connected by at least one flexbeam element to a second torsion element of the predetermined number of torsion elements of the multi-blade rotor, is associated with an n-th rotor blade of the multi-blade rotor. The second torsion element is associated with a (n+2)-th rotor blade of the multi-blade rotor in the circumferential direction of the ring-shaped connection zone defined by the plurality of flexbeam elements for attachment to the rotor hub associated with the rotor shaft of the multi-blade rotor. In other words, given a number N of torsion elements, the first torsion element is a n-th torsion element and the second torsion element is a (n+2)-th torsion element in the circumferential direction of the ring-shaped connection zone, where $1 \leq n \leq N$. Preferably, the number N of torsion elements equals the number of rotor blades of the multi-blade rotor and also the number of flexbeam elements constituting the flexbeam unit. In other words, a multi-blade rotor having e.g. a number of N=5 rotor blades preferably comprises five flexbeam elements that together define five torsion elements.

According to a further preferred embodiment, each flexbeam element comprises at least one upper and one lower lath-shaped beam member, the upper lath-shaped beam member being laterally recessed in a region where the upper lath-shaped beam member is overlapped by an overlapping flexbeam element. This allows laterally extending the upper lath-shaped beam member in the region where it is overlapped by the overlapping flexbeam element without requiring for an increase of an inclination angle of the overlapping flexbeam element relative to the upper lath-shaped beam member.

According to a further preferred embodiment, each flexbeam element comprises at least one upper and one lower lath-shaped beam member, the lower lath-shaped beam member being laterally recessed in a region where the lower lath-shaped beam member overlaps an overlapped flexbeam element. This allows laterally extending the lower lath-shaped beam member in the region where it overlaps the overlapped flexbeam element without requiring for an increase of an inclination angle of the overlapped flexbeam element relative to the lower lath-shaped beam member.

According to a further preferred embodiment, at least one lath-shaped beam member of each flexbeam element comprises at least one lateral projection projecting into the ring-shaped connection zone and defining at least one attachment point for attachment of the flexbeam element to the rotor hub. This enables an easy, robust and secure attachment of the flexbeam elements to the rotor hub without weakening the main structure of the flexbeam elements.

According to a further preferred embodiment, at least one lateral projection has an increased thickness. This allows strengthening of the lateral projection and, thus, of the ring-shaped connection zone in order to allow for a solid, robust and secure attachment of the flexbeam elements to the rotor hub.

According to a further preferred embodiment, each flexbeam element is inclined by a given inclination angle with respect to the at least one in the circumferential direction of the ring-shaped connection zone immediately following flexbeam element. Thus, arranging the flexbeam elements in an interlaced structure in web-like form that defines the ring-shaped connection zone can easily be performed.

According to a further preferred embodiment, each flexbeam element is at least partially S-shaped in its axial direction. This also allows for easily arranging the flexbeam elements in an interlaced structure in web-like form.

According to a further preferred embodiment, each flexbeam element has an inner lateral edge that is facing the ring-shaped connection zone, and an outer lateral edge that is facing away from the ring-shaped connection zone. The inner lateral edge comprises a connection section that is substantially S-shaped in the axial direction of the flexbeam element. The outer lateral edge is preferably substantially straight. This allows strengthening the flexbeam element in the area of the connection zone, as it is only S-shaped on one lateral edge, while the other one is kept essentially straight.

According to a further preferred embodiment, the outer lateral edge comprises a kink of less than 7°. This kink of the flexbeam element encompasses preferably 3° and advantageously defines a flapping precone angle for the rotor blade that is connected with the flexbeam element.

According to a further preferred embodiment, at least one clamping element is arranged in the area of the ring-shaped connection zone to stick the plurality of flexbeam elements in a star-shaped configuration together. The at least one clamping element is preferably adapted to support the flexbeam elements at the areas of the S-shape and/or the kink, preferably with at least one rigid member on the upper and/or at least one rigid member on the lower side of each flexbeam element, in order to avoid delamination of the flexbeam elements at these areas, which could otherwise be caused by tension and compression forces at these areas. One of the rigid members can be integrated in the rotor shaft.

According to a further preferred embodiment, at least one clamping element comprises a central part that substantially covers the ring-shaped connection zone. Preferably, the at least one clamping element comprises a plurality of clamping arms. Thus, a simple, but nevertheless solid and robust clamping element which is easy to manufacture can be provided.

According to a further preferred embodiment, each one of the plurality of clamping arms comprises an associated control cuff bearing. Thus, the at least one clamping element can advantageously be used as a support for a control cuff associated with the multi-blade rotor. Preferably, sufficient space should be provided between each two flexbeam elements defining a given torsion element of the plurality of torsion elements, so that a suitable, e.g. spherical bearing could be arranged in this space.

According to a further preferred embodiment, each one of the plurality of clamping arms comprises associated fixation means for attaching each one of the plurality of clamping arms to an associated flexbeam element. Thus, the flexbeam elements can be clamped rigidly, e.g. between an upper and a lower clamping element, so that maintaining the flexbeam elements in an interlaced structure in web-like form defining a star-shaped configuration can be ensured.

BRIEF DESCRIPTION OF THE SEVERAL VIEWS OF THE DRAWINGS

Preferred embodiments of the invention are outlined by way of example in the following description with reference to the attached drawings. In these attached drawings, identical or identically functioning components and elements are labeled with identical reference numbers and characters and are, consequently, only described once in the following description.

DETAILED DESCRIPTION OF THE INVENTION

Figure 1:
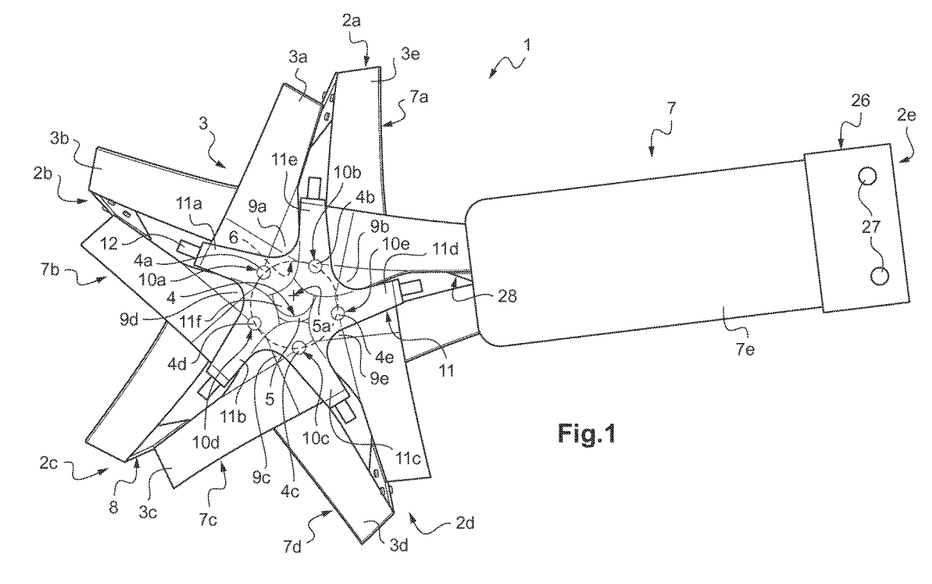
FIG. 1 shows a partially perspective top view of a multi-blade rotor having a flexbeam unit with a clamping element and a blade connector according to the invention.

FIG. 1 shows a multi-blade rotor 1 of a rotary wing aircraft, in particular a multi-blade rotor for a main rotor of a helicopter. The multi-blade rotor 1 comprises a rotor shaft 5 having a rotor shaft axis 5a that defines a rotation axis of the multi-blade rotor 1. The rotor shaft 5 is embodied with a rotor hub 4 provided with a connection arrangement that comprises a plurality of attachment bolts 4a, 4b, 4c, 4d, 4e.

The multi-blade rotor 1 is preferably embodied as a hingeless or a hinge- and bearingless rotor having a flexbeam unit 3 as interface between the rotor shaft 5 and a plurality of rotor blades 2a, 2b, 2c, 2d, 2e. It should, however, be noted that these rotor blades 2a, 2b, 2c, 2d, 2e are not shown in greater detail, neither in FIG. 1 nor in the remaining figures, for simplicity and clarity of the drawings.

The flexbeam unit 3 preferably comprises a plurality of flexbeam elements 3a, 3b, 3c, 3d, 3e defining a plurality 7 of torsion elements. More specifically, the plurality of flexbeam elements 3a, 3b, 3c, 3d, 3e defines a predetermined number of torsion elements 7a, 7b, 7c, 7d, 7e of the multi-blade rotor 1, such that each one of the torsion elements 7a, 7b, 7c, 7d, 7e is associated with a given rotor blade of the plurality of rotor blades 2a, 2b, 2c, 2d, 2e. Furthermore, each one of the torsion elements 7a, 7b, 7c, 7d, 7e preferably comprises at least one blade connector 26 provided with one or more connecting elements 27 for connection to an associated one of the rotor blades 2a, 2b, 2c, 2d, 2e. However, for simplicity and clarity of the drawings only the torsion element 7e is shown with such a blade connector 26 that comprises two connecting elements 27.

The plurality of flexbeam elements 3a, 3b, 3c, 3d, 3e further defines a ring-shaped connection zone 6 for attachment of the flexbeam unit 3 to the rotor hub 4, wherein each one of the plurality of flexbeam elements 3a, 3b, 3c, 3d, 3e can be attached to one or more of the attachment bolts 4a, 4b, 4c, 4d, 4e of the rotor hub 4. The ring-shaped connection zone 6 preferably has a radius that is as small as possible so that the attachment of the plurality of flexbeam elements 3a, 3b, 3c, 3d, 3e to the rotor hub 4 takes place as close as possible to the rotor shaft axis 5a. Therefore, each flexbeam element 3a, 3b, 3c, 3d, 3e comprises at least one lateral projection 9a, 9b, 9c, 9d, 9e projecting into the ring-shaped connection zone 6 and defining at least one attachment point 10a, 10b, 10c, 10d, 10e for attachment of the flexbeam element 3a, 3b, 3c, 3d, 3e to the rotor hub 4. Each flexbeam element 3a, 3b, 3c, 3d, 3e preferably passes the ring-shaped connection zone 6 in a tangential manner and uninterruptedly.

It should be noted that in the context of the present invention, the term "tangential manner" means that each flexbeam element 3a, 3b, 3c, 3d, 3e bypasses the rotor shaft 5 in a transverse direction with respect to the rotor shaft axis 5a, preferably, but not necessarily, in close proximity to the circumference of the rotor shaft 5 and/or the rotor hub 4. Furthermore, the term "uninterruptedly" means that the flexbeam elements 3a, 3b, 3c, 3d, 3e have a continuous form in their axial direction and, thus, define at least continuous centrifugal-force segments with respect to their associated, diametrically opposed rotor blades 2a, 2b, 2c, 2d, 2e.

Each flexbeam element 3a, 3b, 3c, 3d, 3e preferably overlaps at least one in the circumferential direction of the ring-shaped connection zone 6 immediately following flexbeam element 3a, 3b, 3c, 3d, 3e and is preferably overlapped by at least one in the circumferential direction of said ring-shaped connection zone 6 immediately preceding flexbeam element 3a, 3b, 3c, 3d, 3e. Thus, the flexbeam elements 3a, 3b, 3c, 3d, 3e define a star-shaped configuration and, more particularly, an interlaced structure in web-like form. In this interlaced structure, the flexbeam element 3a illustratively overlaps the flexbeam element 3b and is overlapped by the flexbeam element 3d, which in turn is overlapped by the flexbeam element 3c, which in turn is overlapped by the flexbeam element 3e, which in turn is overlapped by the flexbeam element 3b, which in turn is overlapped by the flexbeam element 3a, as mentioned above.

Preferably, at least one substantially rigid clamping element 11 is arranged in the area of the ring-shaped connection zone 6 to stick the plurality of flexbeam elements 3a, 3b, 3c, 3d, 3e in the star-shaped configuration together. This at least one clamping element 11 illustratively resembles to a sea star and comprises a central part 11f that substantially covers the ring-shaped connection zone 6, and a plurality of clamping arms 11a, 11b, 11c, 11d, 11e emanating from the central part 11f in radial direction thereof. Each one of the plurality of clamping arms 11a, 11b, 11c, 11d, 11e comprises an associated control cuff bearing. However, for simplicity and clarity of the drawings only the control cuff bearing provided on the clamping arm 11a is designated with the reference number 12. These control cuff bearings are embodied for bearing a control cuff associated with the multi-blade rotor 1, the control cuff being adapted for setting a current pitch or blade angle of the rotor blades 2a, 2b, 2c, 2d, 2e by controlling an associated torsion of the torsion elements 7a, 7b, 7c, 7d, 7e, i.e. of the flexbeam elements 3a, 3b, 3c, 3d, 3e.

Each one of the flexbeam elements 3a, 3b, 3c, 3d, 3e preferably connects at least one first torsion element 7a, 7b, 7c, 7d, 7e to at least one second torsion element 7a, 7b, 7c, 7d, 7e of the predetermined number of torsion elements 7a, 7b, 7c, 7d, 7e. The at least one first torsion element 7a, 7b, 7c, 7d, 7e is preferably associated with a n-th rotor blade of the plurality of rotor blades 2a, 2b, 2c, 2d, 2e and the at least one second torsion element 7a, 7b, 7c, 7d, 7e is preferably associated with a (n+2)-th rotor blade 2a, 2b, 2c, 2d, 2e in the circumferential direction of the ring-shaped connection zone 6. In other words, the at least one first torsion element 7a, 7b, 7c, 7d, 7e is associated with a given rotor blade of the plurality of rotor blades 2a, 2b, 2c, 2d, 2e and the at least one second torsion element 7a, 7b, 7c, 7d, 7e is associated with a second following or after-next rotor blade 2a, 2b, 2c, 2d, 2e in either of the rotation directions of the multi-blade rotor 1.

Illustratively, the flexbeam element 3a connects the torsion element 7a to the torsion element 7c, which is the after-next torsion element with respect to the torsion element 7a in the counter-clockwise direction of the multi-blade rotor 1. The flexbeam element 3b connects the torsion element 7b to the torsion element 7e, which is the after-next torsion element with respect to the torsion element 7b in the clockwise direction of the multi-blade rotor 1. The flexbeam element 3c connects the torsion element 7c to the torsion element 7e, which is the after-next torsion element with respect to the torsion element 7c in the counter-clockwise direction of the multi-blade rotor 1. The flexbeam element 3d connects the torsion element 7d to the torsion element 7b, which is the after-next torsion element with respect to the torsion element 7d in the clockwise direction of the multi-blade rotor 1. The flexbeam element 3e connects the torsion element 7d to the torsion element 7a, which is the after-next torsion element with respect to the torsion element 7d in the counter-clockwise direction of the multi-blade rotor 1.

In this manner, preferably a total number N of torsion elements 7a, 7b, 7c, 7d, 7e is embodied using a total number N of flexbeam elements 3a, 3b, 3c, 3d, 3e, wherein the first torsion element 7a, 7b, 7c, 7d, 7e is a n-th torsion element and the second torsion element 7a, 7b, 7c, 7d, 7e is a (n+2)-th torsion element in the circumferential direction of the ring-shaped connection zone 6, with $1 \leq n \leq N$. In other words, each one of the torsion elements 7a, 7b, 7c, 7d, 7e is connected via at least one of the flexbeam elements 3a, 3b, 3c, 3d, 3e with a second following or after-next torsion element 7a, 7b, 7c, 7d, 7e in either of the rotation directions of the multi-blade rotor 1.

Illustratively, the torsion element 7a is connected via the flexbeam element 3a to the torsion element 7c, which is the after-next torsion element with respect to the torsion element 7a in the counter-clockwise direction of the multi-blade rotor 1, and via the flexbeam element 3e to the torsion element 7d, which is the after-next torsion element with respect to the torsion element 7a in the clockwise direction of the multi-blade rotor 1. The torsion element 7b is connected via the flexbeam element 3b to the torsion element 7e, which is the after-next torsion element with respect to the torsion element 7b in the clockwise direction of the multi-blade rotor 1, and via the flexbeam element 3d to the torsion element 7d, which is the after-next torsion element with respect to the torsion element 7b in the counter-clockwise direction of the multi-blade rotor 1.

The torsion element 7c is connected via the flexbeam element 3c to the torsion element 7e, which is the after-next torsion element with respect to the torsion element 7c in the counter-clockwise direction of the multi-blade rotor 1, and via the flexbeam element 3a to the torsion element 7a, which is the after-next torsion element with respect to the torsion element 7c in the clockwise direction of the multi-blade rotor 1. The torsion element 7d is connected via the flexbeam element 3d to the torsion element 7b, which is the after-next torsion element with respect to the torsion element 7d in the clockwise direction of the multi-blade rotor 1, and via the flexbeam element 3e to the torsion element 7a, which is the after-next torsion element with respect to the torsion element 7d in the counter-clockwise direction of the multi-blade rotor 1. The torsion element 7e is connected via the flexbeam element 3b to the torsion element 7b, which is the after-next torsion element with respect to the torsion element 7e in the counter-clockwise direction of the multi-blade rotor 1, and via the flexbeam element 3c to the torsion element 7c, which is the after-next torsion element with respect to the torsion element 7e in the clockwise direction of the multi-blade rotor 1.

It should be noted that each one of the torsion elements 7a, 7b, 7c, 7d, 7e comprises by way of example two separate flexbeam elements 3a, 3d, 3c, 3d, 3e, but may alternatively also comprise more than two separate flexbeam elements as well as other components, which are not illustrated for simplicity and clarity of the drawings, but which are well-known by the person skilled in the art. Illustratively, the torsion element 7a comprises the two flexbeam elements 3a and 3e, the torsion element 7b comprises the two flexbeam elements 3b and 3d, the torsion element 7c comprises the two flexbeam elements 3a and 3c etc. Each such two flexbeam elements 3a, 3e; 3b, 3d; 3a, 3c etc. are preferably rigidly attached to each other via an associated beam connector of a plurality of beam connectors 8. For simplicity and clarity of the drawings and the further description, only the beam connector of the torsion element 7e is designated by an individual reference number, i.e. the number 28.

It should further be noted that, in the multi-blade rotor 1, the number N of the torsion elements 7a, 7b, 7c, 7d, 7e equals the number of the rotor blades 2a, 2b, 2c, 2d, 2e and also the number of the flexbeam elements 3a, 3d, 3c, 3d, 3e. More specifically, the multi-blade rotor 1 comprises illustratively a number of N=5 torsion elements 7a, 7b, 7c, 7d, 7e that are defined using a number of five flexbeam elements 3a, 3d, 3c, 3d, 3e and that are connected with a number of five rotor blades 2a, 2b, 2c, 2d, 2e. However, in the multi-blade rotor 1 the number N is set to N=5 only by way of example and not for restricting the invention thereto, as the invention can be applied to all multi-blade rotors having three or more rotor blades and torsion elements, i.e. for all multi-blade rotors where N≥3.

Figure 2:
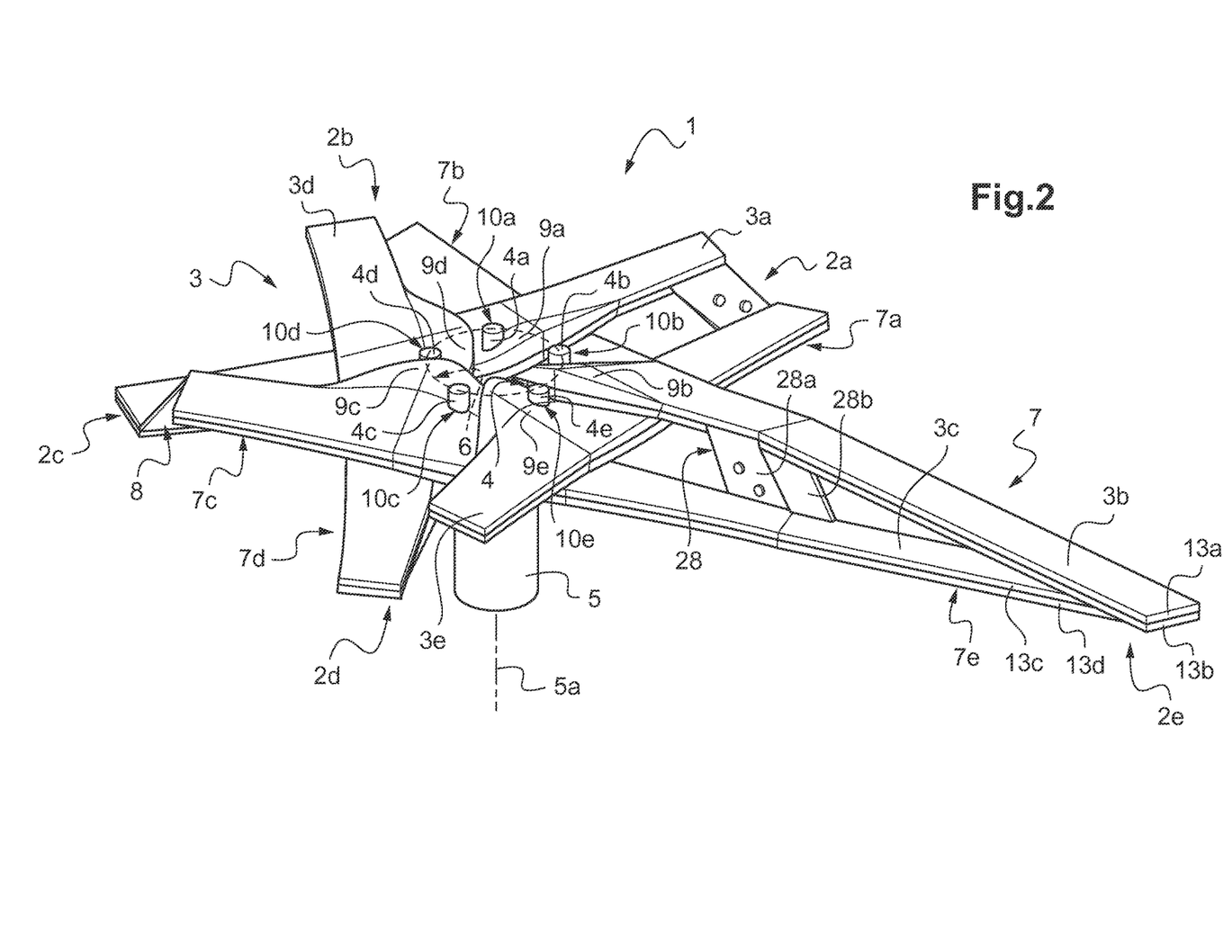
FIG. 2 shows a perspective view of the multi-blade rotor of FIG. 1, without the clamping element and the blade connector of FIG. 1.

FIG. 2 shows the multi-blade rotor 1 of FIG. 1 with the flexbeam unit 3 that is attached to the rotor hub 4 of the rotor shaft 5. The multi-blade rotor 1 is shown without the clamping element 11 of FIG. 1 to highlight the interlaced structure in web-like form defining the star-shaped configuration of the flexbeam elements 3a, 3b, 3c, 3d, 3e, wherein each flexbeam element 3a, 3b, 3c, 3d, 3e overlaps at least one other and is overlapped by at least one other flexbeam element 3a, 3b, 3c, 3d, 3e.

Each flexbeam element 3a, 3b, 3c, 3d, 3e comprises one or more strip-, bar- and/or lath-shaped beam members, which are hereinafter simply referred to as the "lath-shaped beam members" and which can be connected to each other, at least partially, or not. Preferably, each flexbeam element 3a, 3b, 3c, 3d, 3e comprises at least one upper and one lower lath-shaped beam member. Illustratively, the flexbeam element 3b comprises an upper lath-shaped beam member 13a and a lower lath-shaped beam member 13b and the flexbeam element 3c comprises an upper lath-shaped beam member 13c and a lower lath-shaped beam member 13d. It should, however, be noted that the lath-shaped members of the remaining flexbeam elements 3a, 3d, 3e are not referenced individually for simplicity and clarity of the drawings.

The lath-shaped beam members 13a, 13b, 13c, 13d are preferably embodied in fiber composite material. In particular, the lath-shaped beam members 13a, 13b, 13c, 13d can be manufactured using a RTM process.

As can be seen from FIG. 2, the flexbeam elements 3a, 3b, 3c, 3d, 3e of each torsion element 7a, 7b, 7c, 7d, 7e of the multi-blade rotor 1 may enclose an associated opening angle, which is best illustrated and described in the following by way of example with respect to the flexbeam elements 3b, 3c. This opening angle is caused by the flexbeam element 3b overlapping the flexbeam element 3e and the flexbeam element 3c being overlapped by the flexbeam element 3e, and may be in the range from 0° to about 20°. Preferably, this opening angle is corrected by the beam connector 28 that is used to attach both flexbeam elements 3b, 3c together and that is adapted to allow for a change of inclination of the flexbeam elements 3b, 3c. More specifically, the inclination of the flexbeam elements 3b, 3c can change in the area of the beam connector 28 to an at least substantially parallel alignment of the flexbeam elements 3b, 3c as the beam connector 28 would compensate all loads that apply perpendicularly to the flexbeam elements 3b, 3c in the area of the beam connector 28.

Figure 3:
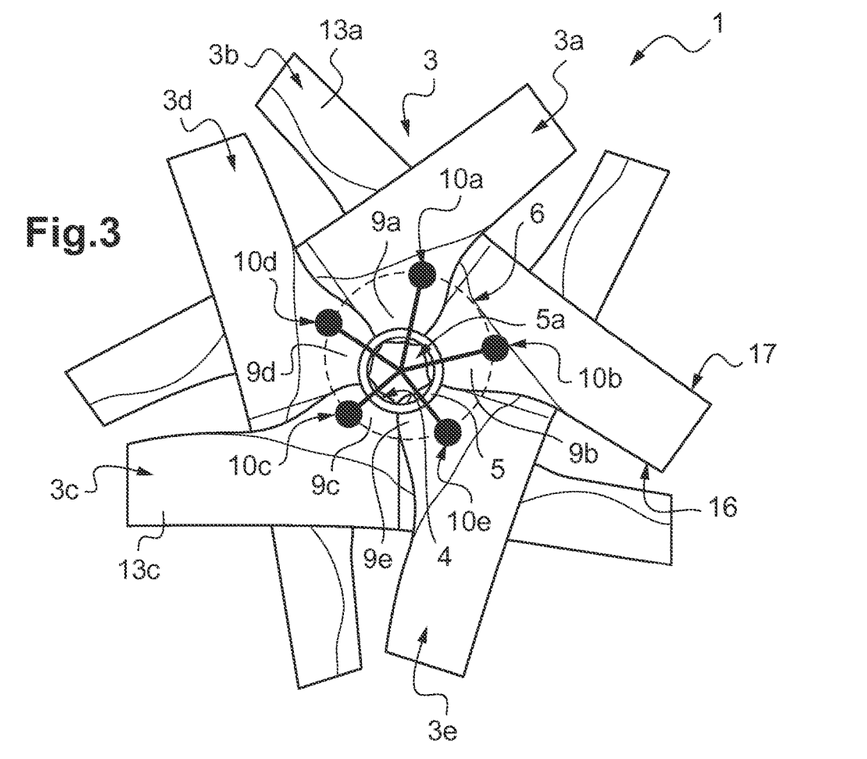
FIG. 3 shows a top view of the multi-blade rotor of FIG. 1, without the clamping element and the blade connector of FIG. 1.

The beam connector 28 preferably consists of two separate beam connector components 28a, 28b that are connected together by means of screws, rivets and/or a bonding process. The beam connector component 28a is preferably integral with the flexbeam element 3c and, more specifically, with the upper lath-shaped beam member 13c thereof. The beam connector component 28b is preferably integral with the flexbeam element 3b and, more specifically, with the lower lath-shaped beam member 13b thereof FIG. 3 shows the multi-blade rotor 1 of FIG. 1 and FIG. 2 with the flexbeam unit 3 that is attached to the rotor hub 4 of the rotor shaft 5. The multi-blade rotor 1 is shown without the clamping element 11 of FIG. 1 to highlight the lateral projections 9a, 9b, 9c, 9d, 9e of the flexbeam elements 3a, 3b, 3c, 3d, 3e that are projecting into the ring-shaped connection zone 6 and that are defining the attachment points 10a, 10b, 10c, 10d, 10e for attachment of the flexbeam elements 3a, 3b, 3c, 3d, 3e to the rotor hub 4.

Preferably, the lateral projections 9a, 9b, 9c, 9d, 9e are embodied as bulges or convex protrusions emanating from a longitudinal lateral edge of each associated flexbeam element 3a, 3b, 3c, 3d, 3e, the longitudinal lateral edge being facing the rotor shaft 5, i.e. the ring-shaped connection zone 6, and being directed towards the rotor shaft 5. By way of example, the longitudinal lateral edge of the flexbeam element 3b is designated with the reference number 16 and hereinafter referred to as the "inner lateral edge 16" for brevity. Accordingly, the opposed longitudinal lateral edge of the flexbeam element 3b, which is facing away from the ring-shaped connection zone 6, is hereinafter referred to as the "outer lateral edge" and referred to with the reference number 17.

The lateral projections 9a, 9b, 9c, 9d, 9e are at least integral with one lath-shaped beam member of an associated flexbeam element 3a, 3b, 3c, 3d, 3e, but preferably with all lath-shaped beam members constituting the flexbeam element 3a, 3b, 3c, 3d, 3e. For instance, the lateral projections 9b and 9c are at least integral with the upper lath-shaped beam members 13a and 13c of the flexbeam elements 3b and 3c.

As was mentioned above, each flexbeam element 3a, 3b, 3c, 3d, 3e comprises at least one lateral projection 9a, 9b, 9c, 9d, 9e defining at least one attachment point 10a, 10b, 10c, 10d, 10e for attachment of the flexbeam element 3a, 3b, 3c, 3d, 3e to the rotor hub 4. However, preferably each lateral projection 9a, 9b, 9c, 9d, 9e defines exactly two attachment points for attachment of an associated one of the flexbeam elements 3a, 3b, 3c, 3d, 3e to the rotor hub 4. More specifically, the lateral projection 9a is preferably embodied such that it defines the attachment points 10a and 10d, the lateral projection 9b is preferably embodied such that it defines the attachment points 10a and 10b, the lateral projection 9c is preferably embodied such that it defines the attachment points 10c and 10e, the lateral projection 9d is preferably embodied such that it defines the attachment points 10c and 10d, and the lateral projection 9e is preferably embodied such that it defines the attachment points 10b and 10e.

Figure 4:
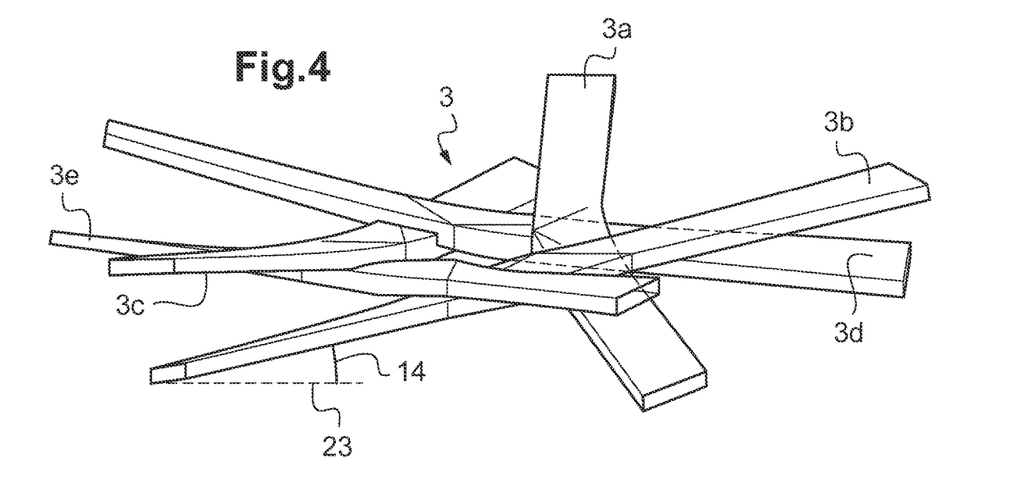
FIG. 4 shows a perspective view of the flexbeam unit of FIG. 1 to FIG. 3.

FIG. 4 shows the flexbeam unit 3 of FIG. 1 to FIG. 3 to highlight the interlaced structure in web-like form defining the star-shaped configuration of the flexbeam elements 3a, 3b, 3c, 3d, 3e, wherein each flexbeam element 3a, 3b, 3c, 3d, 3e overlaps at least one other and is overlapped by at least one other flexbeam element 3a, 3b, 3c, 3d, 3e. In order to allow for such an overlapping and being overlapped, each flexbeam element 3a, 3b, 3c, 3d, 3e can be inclined by a given inclination angle 14 with respect to an immediately following flexbeam element 3a, 3b, 3c, 3d, 3e in the circumferential direction of the ring-shaped connection zone 6 and/or with respect to a horizontal axis 23, which is aligned perpendicular to the rotor shaft axis 5a of FIG. 1. For simplicity and clarity, the inclination angle 14 is only shown for the flexbeam element 3b.

Figure 5:
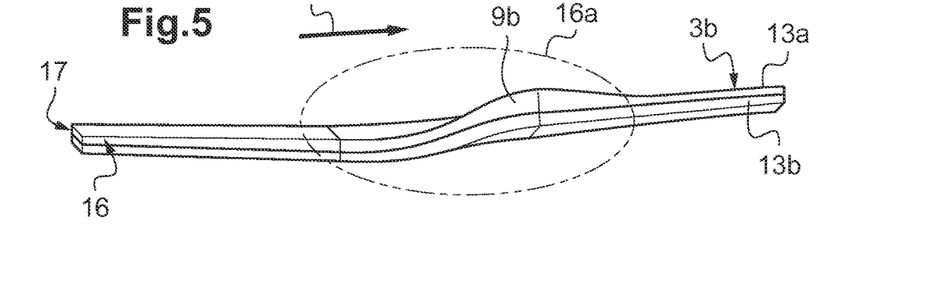
FIG. 5 shows an inner lateral edge of a flexbeam element of the flexbeam unit of FIG. 1 to FIG. 4.

FIG. 5 shows the flexbeam element 3b of FIG. 1 to FIG. 4, which is described in more detail in the following, representative for all flexbeam elements 3a, 3b, 3c, 3d, 3e. The flexbeam element 3b can be at least partially S-shaped in its axial direction, which is represented by an arrow 15, in order to allow for the overlapping and being overlapped as described above. Preferably, the S-shape is provided on the inner lateral edge 16 of the flexbeam element 3b in a region thereof that encompasses the radial projection 9b and, thus, defines a connection section 16a that is substantially S-shaped in the axial direction 15.

Figure 6:
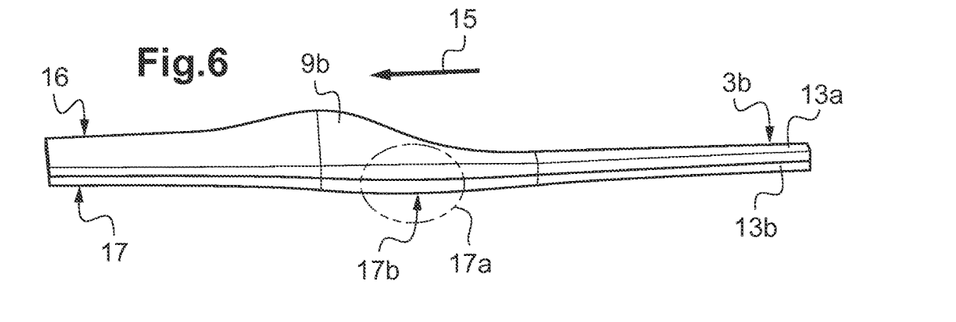
FIG. 6 shows an outer lateral edge of the flexbeam element of FIG. 5.

FIG. 6 shows the outer lateral edge 17 of the flexbeam element 3b of FIG. 5, which is substantially straight and preferably comprises a kink region 17a with a kink 17b of less than 7°, in particular of 3°. The kink 17b defines a flapping precone angle for the rotor blade that is connected with the flexbeam element 3b in the multi-blade rotor 1 of FIG. 1 and FIG. 2 in the direction opposed to the arrow 15, i.e. the rotor blade 2b.

Figure 7:
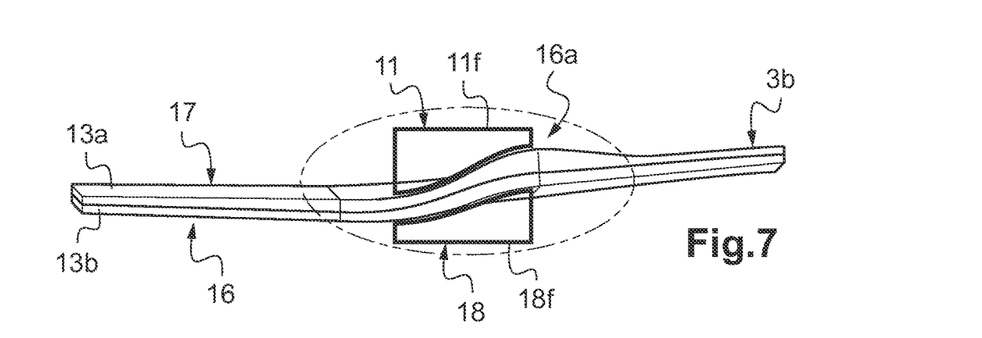
FIG. 7 shows the inner lateral edge of the flexbeam element of FIG. 5 with an upper and a lower clamping element according to the invention.

FIG. 7 shows the inner lateral edge 16 of the flexbeam element 3b of FIG. 5 and FIG. 6, which is clamped by the clamping element 11 of FIG. 1 and an at least substantially rigid clamping element 18 to avoid delamination of the flexbeam element 3b. Illustratively, the clamping element 11 defines an upper clamping element and the clamping element 18 defines a lower clamping element, which can be embodied substantially similar to the upper clamping element 11.

Figure 12:
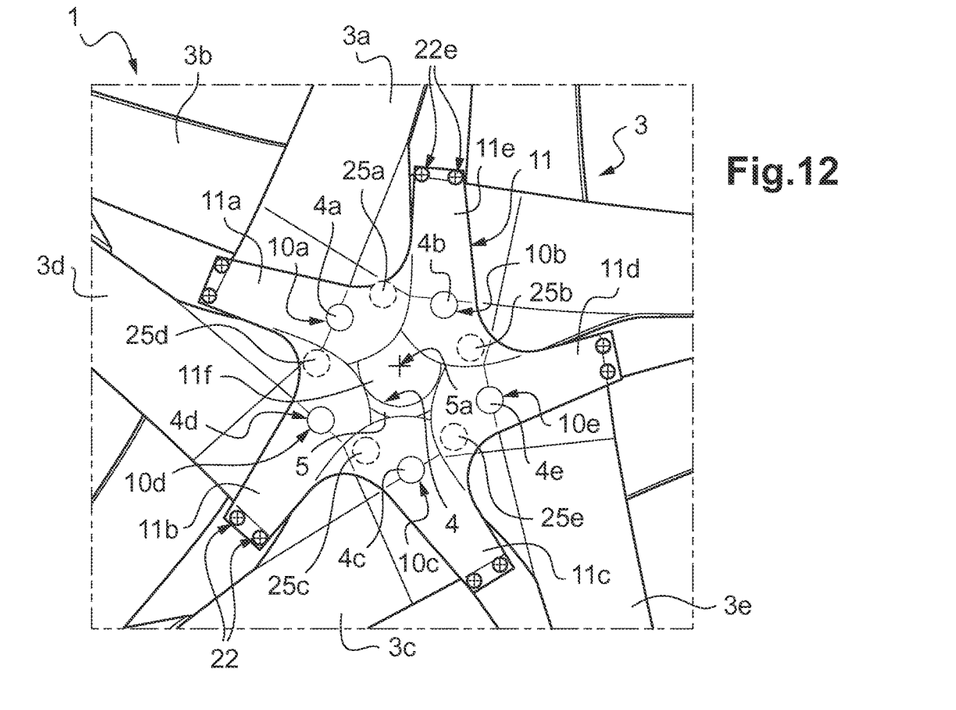
FIG. 12 shows a top view of the multi-blade rotor of FIG. 1 to FIG. 3 having additional attachment bolts for attachment of the flexbeam unit to the rotor hub of FIG. 1.

More specifically, the connection section 16a of the flexbeam element 3b is preferably at least partially clamped between the central part 11f of the upper clamping element 11 and a corresponding central part 18f of the lower clamping element 18. The central part 11f is also referred to hereinafter as the "central upper clamping element part" and the central part 18f is also referred to hereinafter as the "central lower clamping element part". The central upper clamping element part 11 and the central lower clamping element part 18 can be fixed together using e.g. five or ten bolts as illustrated in FIG. 1 and FIG. 12.

Figure 8:
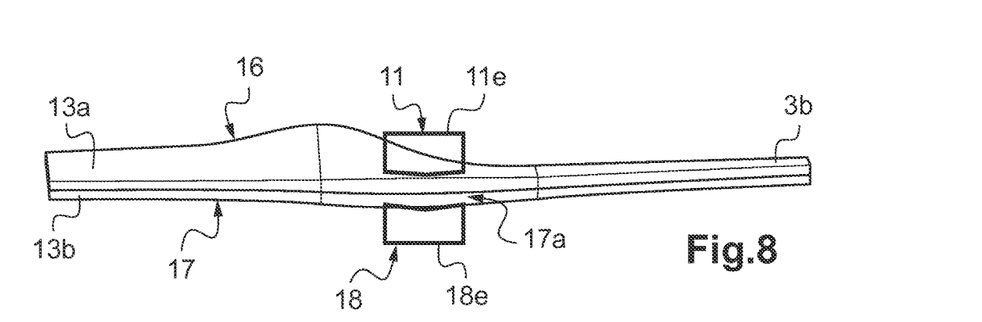
FIG. 8 shows the outer lateral edge of the flexbeam element of FIG. 6 with an upper and a lower clamping element according to the invention.

FIG. 8 shows the flexbeam element 3b according to FIG. 7, which is clamped by the clamping elements 11 and 18 and viewed in the direction of the outer lateral edge 17. As can be seen from FIG. 8, the kink area 17a of the flexbeam element 3b is preferably substantially clamped between the clamping arm 11e of the upper clamping element 11 and a corresponding clamping arm 18e of the lower clamping element 18. The clamping arm 11e is rigidly connected with the central upper clamping element part 11f of FIG. 1 and FIG. 7 as described above, and the clamping arm 18e is rigidly connected with the central lower clamping element part 18f of FIG. 7. Furthermore, the clamping arm 18e and/or the clamping arm 11e can be used as a support for the control cuff bearing 12 of FIG. 1.

Figure 9:
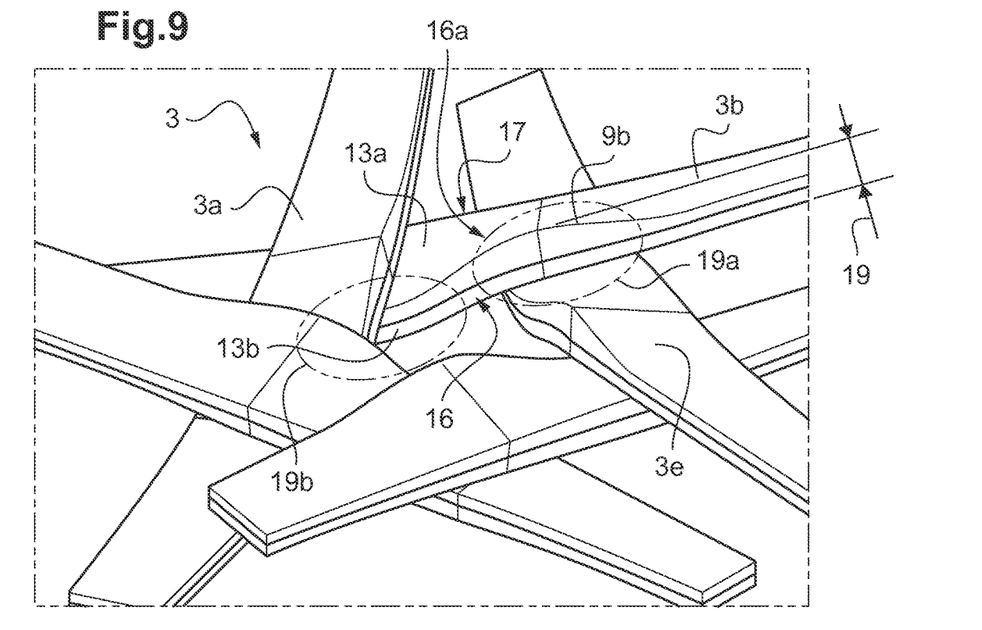
FIG. 9 shows a perspective view of the flexbeam unit of FIG. 1 to FIG. 4 having a flexbeam element with an increased thickness.

FIG. 9 shows the flexbeam unit 3 of FIG. 1 to FIG. 3 with the flexbeam element 3b having on its inner lateral edge 16 at its lateral projection 9b, i.e. its connection section 16a, a zone 19a of increased thickness 19. The increased thickness zone 19a is preferably in a region of the flexbeam element 3b, where it overlaps the flexbeam element 3e and where it is attached to the rotor hub 4 of FIG. 1 to FIG. 3. Alternatively, or in addition thereto, another increased thickness zone 19b can be provided in a region of the flexbeam element 3b, where it is overlapped by the flexbeam element 3a.

Figure 10:
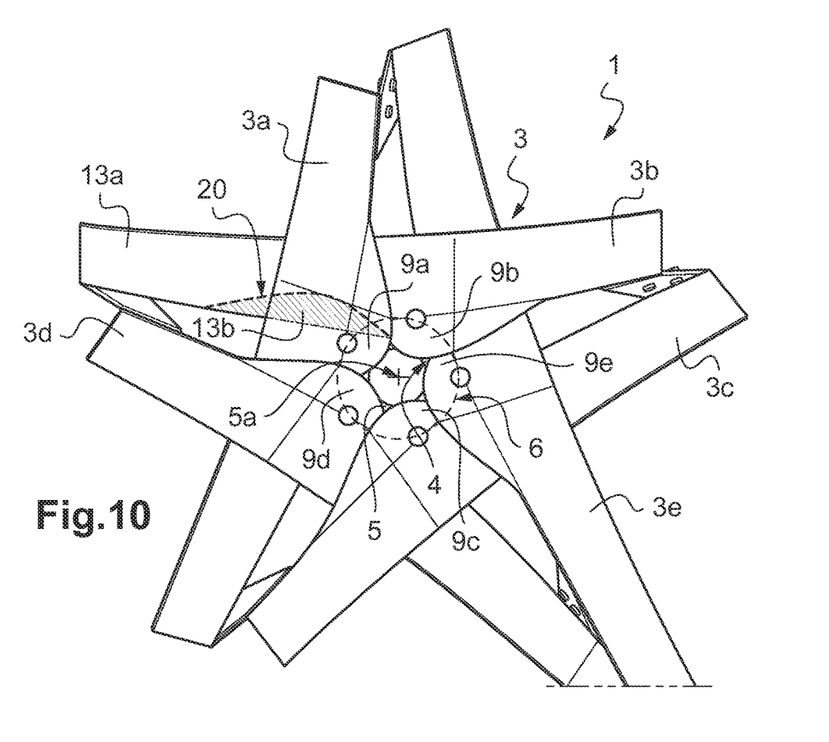
FIG. 10 shows a top view of the multi-blade rotor of FIG. 1 to FIG. 3 having a flexbeam element with a recessed region, without the clamping element and the blade connector of FIG. 1.

FIG. 10 shows the multi-blade rotor 1 of FIG. 1 to FIG. 3 with the flexbeam unit 3 that is attached to the rotor hub 4 of the rotor shaft 5. The multi-blade rotor 1 is again shown without the clamping element 11 of FIG. 1 to highlight the lateral projections 9a, 9b, 9c, 9d, 9e of the flexbeam elements 3a, 3b, 3c, 3d, 3e that are projecting into the ring-shaped connection zone 6. The flexbeam element 3b illustratively comprises the upper and lower lath-shaped beam members 13a, 13b as described above.

Preferably, the upper lath-shaped beam member 13a is laterally recessed in a region 20 where the upper lath-shaped beam member 13a is overlapped by the overlapping flexbeam element 3a. The flexbeam element 3a, which overlaps the flexbeam element 3b, is illustrated with dashed lines and in a transparent manner in order to highlight the recessed region 20.

Figure 11:
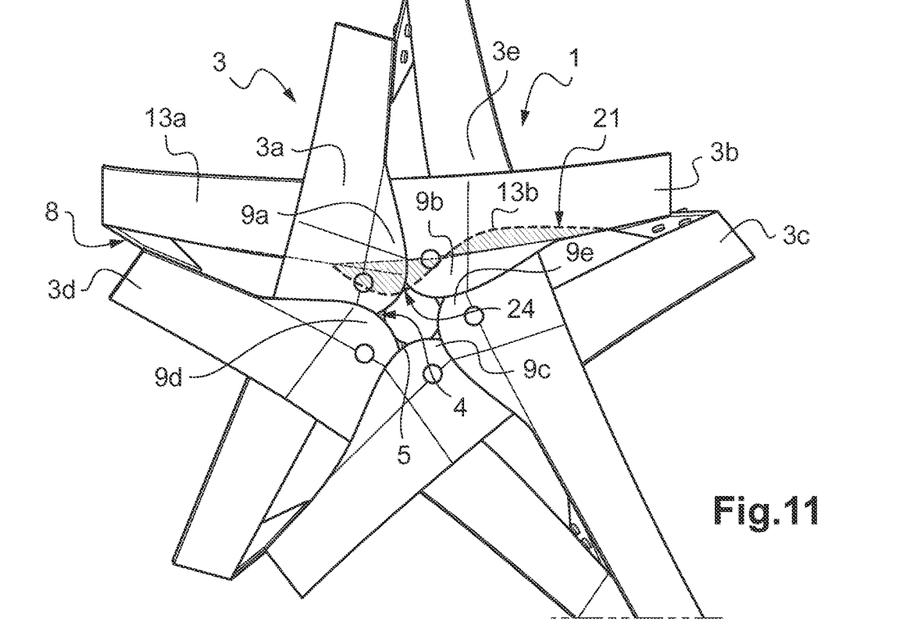
FIG. 11 shows a top view of the multi-blade rotor of FIG. 1 to FIG. 3 having a flexbeam element with a recessed region and with an extended region, without the clamping element and the blade connector of FIG. 1.

FIG. 11 shows the multi-blade rotor 1 of FIG. 1 to FIG. 3 with the flexbeam unit 3 that is attached to the rotor hub 4 of the rotor shaft 5. The multi-blade rotor 1 is again shown without the clamping element 11 of FIG. 1 to highlight the lateral projections 9a, 9b, 9c, 9d, 9e of the flexbeam elements 3a, 3b, 3c, 3d, 3e. The flexbeam element 3b illustratively comprises the upper and lower lath-shaped beam members 13a, 13b as described above.

Preferably, the lower lath-shaped beam member 13b is laterally recessed in a region 21 where the lower lath-shaped beam member 13b overlaps the overlapped flexbeam element 3e. It should be noted that this recessed region 21 is covered by the upper lath-shaped beam member 13a, which is therefore illustrated in a transparent manner to highlight the recessed region 21.

Furthermore, the lower lath-shaped beam member 13b can be laterally extended in a region 24 where the lower lath-shaped beam member 13b is overlapped by the overlapping flexbeam element 3a. The flexbeam element 3a, which overlaps this extended region 24, is illustrated with dashed lines and in a transparent manner in order to highlight the extended region 24.

It should be noted that the person skilled in the art would readily recognize where such extensions and recesses could be applied to the flexbeam elements e.g. for strengthening purposes. Accordingly, all such extensions and recesses are considered as being part of the present invention. For instance, the upper lath-shaped beam member 13a may also be extended in an area where free space is available etc.

FIG. 12 shows the multi-blade rotor 1 of FIG. 1 and FIG. 2 with the flexbeam unit 3 having the flexbeam elements 3a, 3b, 3c, 3d, 3e that are attached to the rotor hub 4 of the rotor shaft 5 via the attachment points 10a, 10b, 10c, 10d, 10e defined by the lateral projections 9a, 9b, 9c, 9d, 9e. FIG. 12 also illustrates the upper clamping element 11 with the central upper clamping element part 11f and the plurality of clamping arms 11a, 11b, 11c, 11d, 11e that clamp the flexbeam elements 3a, 3b, 3c, 3d, 3e together.

Each one of the plurality of clamping arms 11a, 11b, 11c, 11d, 11 e preferably comprises associated fixation means of a plurality of fixation means 22 for attaching each one of the plurality of clamping arms 11a, 11b, 11c, 11d, 11 e to an associated flexbeam element 3a, 3b, 3c, 3d, 3e. For instance, fixation means 22e are preferably provided for fixing the clamping arm 11e to the clamping arm 18e of FIG. 8, so that the flexbeam element 3b is clamped between these two clamping arms 11e, 18e and, therefore, attached to these clamping arms 11e, 18e.

It should be noted that the above described, preferred embodiments are merely described to illustrate possible embodiments of the present invention, but not in order to restrict the present invention thereto. Instead, multiple modifications and variations of the invention are possible and should, therefore, also be considered as being part of the invention. For instance, instead of fixing the flexbeam elements 3a, 3b, 3c, 3d, 3e and the clamping elements 11, 18 to only five attachment bolts 4a, 4b, 4c, 4d, 4e of the rotor hub 4, additional attachment bolts 25a, 25b, 25c, 25d, 25e can be provided. Furthermore, the upper and/or lower clamping elements 11, 18 can be embodied by clamping elements that have a shape that differs to the above described star-shaped configuration, wherein the upper clamping element can be provided with an identical or a different shape than the lower clamping element. For instance, the upper and lower clamping elements can be embodied as pentagon-shaped cover elements without any distinguishable clamping arms as described below, etc.

Figure 13:
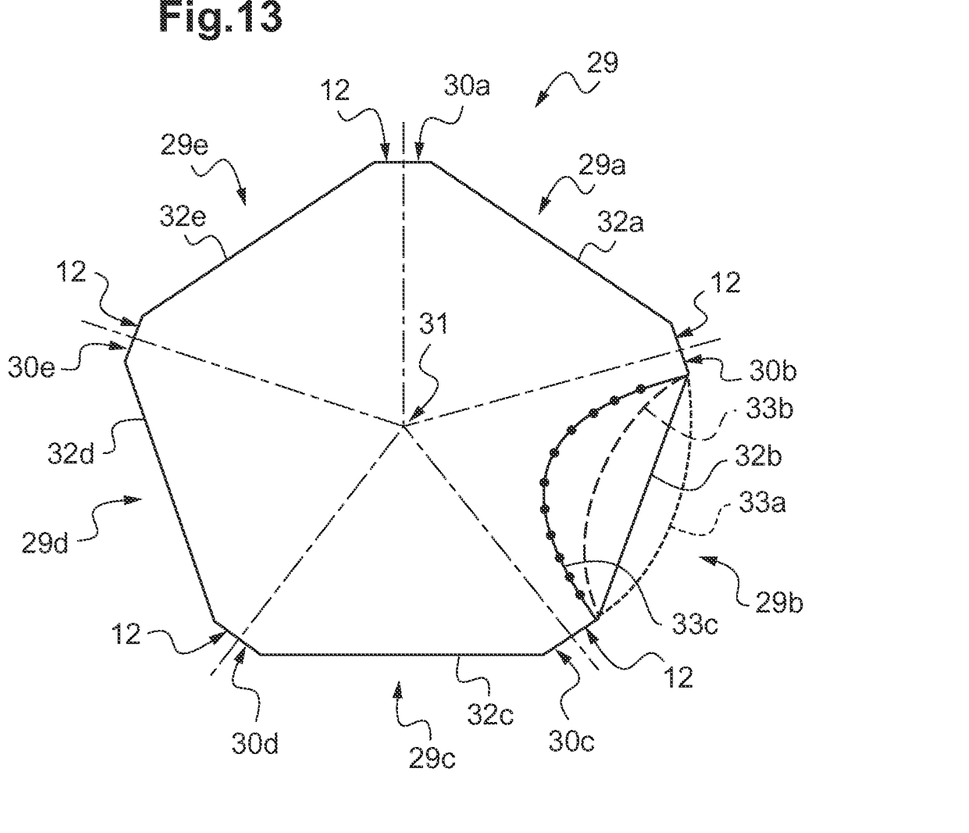
FIG. 13 shows a top view of an alternative clamping element for use with the multi-blade rotor of FIG. 1, FIG. 11 and/or FIG. 12.

FIG. 13 shows an alternative clamping element 29 that can be used to embody the upper and lower clamping elements 11 and 18 described above. Instead of having a sea star form with a central part having a plurality of clamping arms emanating from the central part in radial direction thereof, the clamping element 29 is embodied as a pentagon-shaped and at least partially rigid clamping member preferably having a central clamping element axis 31, around which a central hole could be embodied, and five clamping corners 30a, 30b, 30c, 30d, 30e, each one comprising an associated control cuff bearing 12. These clamping corners 30a, 30b, 30c, 30d, 30e are connected with adjacent clamping corners by clamping element edges 32a, 32b, 32c, 32d, 32e that define with corresponding adjacent ones of the clamping corners 30a, 30b, 30c, 30d, 30e clamping element sections 29a, 29b, 29c, 29d, 29e. In these clamping element sections 29a, 29b, 29c, 29d, 29e, the clamping element edges 32a, 32b, 32c, 32d, 32e are preferably straight, as illustrated.

It should, however, be noted that the clamping element edges 32a, 32b, 32c, 32d, 32e can be implemented using other edge forms, as illustrated by way of example with alternative edge forms 33a, 33b, 33c, which are only shown with respect to the clamping element edge 32b for simplicity and clarity of the drawings, but which can likewise be applied to one or more of the other clamping element edges 32a, 32c, 32d, 32e. Thereby, the alternative edge form 33a illustrates a convex shaping of the clamping element edge 32b. The alternative edge form 33b illustrates a concave shaping of the clamping element edge 32b. The alternative edge form 33c shows another concave shaping of the clamping element 32b with a higher degree of concavity which leads to the shaping shown e.g. in FIG. 1 with respect to the clamping element 11, when being applied to all clamping element edges 32a, 32b, 32c, 32d, 32e.

REFERENCE LIST 1 multi-blade rotor
2a, 2b, 2c, 2d, 2e rotor blades
3 flexbeam unit
3a, 3b, 3c, 3d, 3e flexbeam elements
4 rotor hub
4a, 4b, 4c, 4d, 4e attachment bolts
5 rotor shaft axis
6 connection zone
7 plurality of torsion elements
7a, 7b, 7c, 7d, 7e torsion elements
8 plurality of beam connectors
9a, 9b, 9c, 9d, 9e lateral projection
10a, 10b, 10c, 10d, 10e attachment point
11 upper clamping element
11a, 11b, 11c, 11d, 11e upper clamping arms
11f central upper clamping element part
12 control cuff bearing arrangement
13a, 13b, 13c, 13d lath-shaped beam members
14 inclination angle
15 axial direction
16 inner lateral edge
16a connection zone
17 outer lateral edge
17a kink area
17b kink
18 lower clamping element
18e lower clamping arm
18f central lower clamping element part
19 increased thickness
19a, 19b increased thickness zones
20 recessed region
21 recessed region
22 plurality of fixation means
22e fixation means
23 horizontal axis
24 extended region
25a, 25b, 25c, 25d, 25e additional attachment bolts
26 blade connector
27 connecting elements 28 single beam connector
28a, 28b beam connector components
29 clamping element
29a, 29b, 29c, 29d, 29e clamping element sections
30a, 30b, 30c, 30d, 30e clamping corners
31 clamping element axis
32a, 32b, 32c, 32d, 32e clamping element edges
33a, 33b, 33c alternative edge forms

What is claimed is:

1. A flexbeam unit for a multi-blade rotor of a rotary wing aircraft, the flexbeam unit comprising a plurality of flexbeam elements that define a predetermined number of torsion elements and a ring-shaped connection zone for attachment to a rotor hub associated with a rotor shaft of the multi-blade rotor, each flexbeam element passing the ring-shaped connection zone in a tangential manner and uninterruptedly connecting a first torsion element to a second torsion element of the predetermined number of torsion elements, wherein each flexbeam element overlaps at least one in a circumferential direction of the ring-shaped connection zone immediately following flexbeam element and is overlapped by at least one in the circumferential direction of the ring-shaped connection zone immediately preceding flexbeam element, wherein each flexbeam element comprises at least one lath-shaped beam member, and wherein the at least one lath-shaped beam member of each flexbeam element comprises at least one lateral projection projecting into the ring-shaped connection zone and defining at least one attachment point for attachment of the flexbeam element to the rotor hub.

2. The flexbeam unit according to claim 1, wherein the first torsion element is associated with a n-th rotor blade of the multi-blade rotor and the second torsion element is associated with a (n+2)-th rotor blade of the multi-blade rotor in the circumferential direction of the ring-shaped connection zone.

3. The flexbeam unit according to claim 1, having a number N of torsion elements, the first torsion element being a n-th torsion element and the second torsion element being a (n+2)-th torsion element in the circumferential direction of the ring-shaped connection zone, where $1 \leq (n+2) \leq N$.

4. The flexbeam unit according to claim 1, wherein each flexbeam element comprises at least one upper and one lower lath-shaped beam member, the upper lath-shaped beam member being laterally recessed in a region where the upper lath-shaped beam member is overlapped by an overlapping flexbeam element.

5. The flexbeam unit according to claim 1, wherein each flexbeam element comprises at least one upper and one lower lath-shaped beam member, the lower lath-shaped beam member being laterally recessed in a region where the lower lath-shaped beam member overlaps an overlapped flexbeam element.

6. The flexbeam unit according to claim 1, wherein at least one lateral projection has an increased thickness.

7. The flexbeam unit according to claim 1, wherein each flexbeam element is inclined by a given inclination angle with respect to the at least one in the circumferential direction of the ring-shaped connection zone immediately following flexbeam element.

8. The flexbeam unit according to claim 1, wherein each flexbeam element is at least partially S-shaped in its axial direction.

9. The flexbeam unit according to claim 8, wherein each flexbeam element has an inner lateral edge that is facing the ring-shaped connection zone and an outer lateral edge that is facing away from the ring-shaped connection zone, the inner lateral edge comprising a connection section that is substantially S-shaped in the axial direction.

10. The flexbeam unit according to claim 9, wherein the outer lateral edge is substantially straight.

11. The flexbeam unit according to claim 10, wherein the outer lateral edge comprises a kink of less than 7°.

12. The flexbeam unit according to claim 1, wherein at least one clamping element is arranged in the area of the ring-shaped connection zone to stick the plurality of flexbeam elements in a star-shaped configuration together.

13. The flexbeam unit according to claim 12, wherein at least one clamping element comprises a central part that substantially covers the ring-shaped connection zone.

14. The flexbeam unit according to claim 12, wherein at least one clamping element comprises a plurality of clamping arms.

15. The flexbeam unit according to claim 14, wherein each one of the plurality of clamping arms comprises an associated control cuff bearing.

16. The flexbeam unit according to claim 14, wherein each one of the plurality of clamping arms comprises associated fixation means for attaching each one of the plurality of clamping arms to an associated flexbeam element.

17. A flexbeam unit for a multi-blade rotor of a rotary wing aircraft, the flexbeam unit comprising a plurality of flexbeam elements that define a predetermined number of torsion elements and a ring-shaped connection zone for attachment to a rotor hub associated with a rotor shaft of the multi-blade rotor, each flexbeam element passing the ring-shaped connection zone in a tangential manner and uninterruptedly connecting a first torsion element to a second torsion element of the predetermined number of torsion elements, wherein each flexbeam element overlaps at least one in a circumferential direction of the ring-shaped connection zone immediately following flexbeam element and is overlapped by at least one in the circumferential direction of the ring-shaped connection zone immediately preceding flexbeam element, wherein each flexbeam element comprises at least one lath-shaped beam member, and wherein each flexbeam element is at least partially S-shaped in its axial direction.

18. A flexbeam unit for a multi-blade rotor of a rotary wing aircraft, the flexbeam unit comprising a plurality of flexbeam elements that define a predetermined number of torsion elements and a ring-shaped connection zone for attachment to a rotor hub associated with a rotor shaft of the multi-blade rotor, each flexbeam element passing the ring-shaped connection zone in a tangential manner and uninterruptedly connecting a first torsion element to a second torsion element of the predetermined number of torsion elements, wherein each flexbeam element overlaps at least one in a circumferential direction of the ring-shaped connection zone immediately following flexbeam element and is overlapped by at least one in the circumferential direction of the ring-shaped connection zone immediately preceding flexbeam element, wherein each flexbeam element comprises at least one lath-shaped beam member, and wherein at least one clamping element is arranged in the area of the ring-shaped connection zone to stick the plurality of flexbeam elements in a star-shaped configuration together, the at least one clamping element comprising a plurality of clamping arms, each one of the plurality of clamping arms comprising an associated control cuff bearing.

* * * * *